(No Model.) 8 Sheets—Sheet 3.

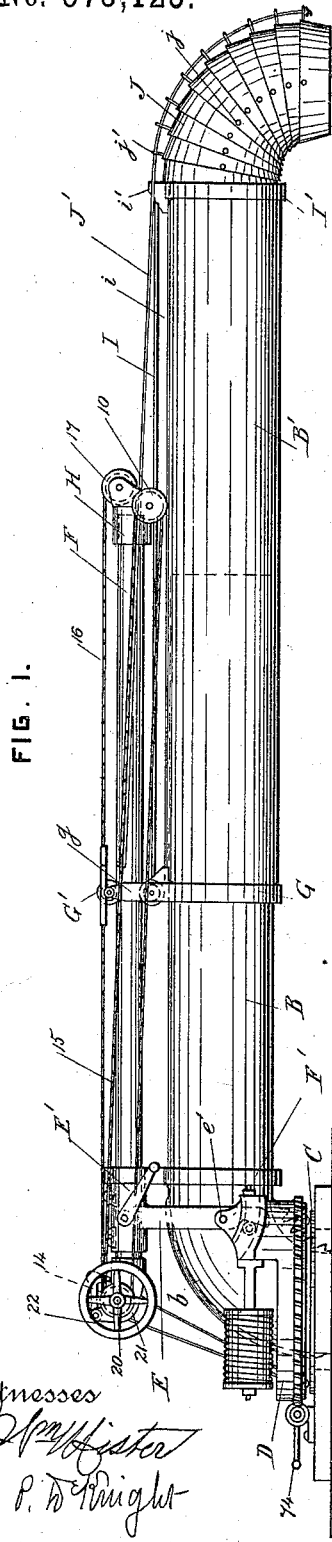

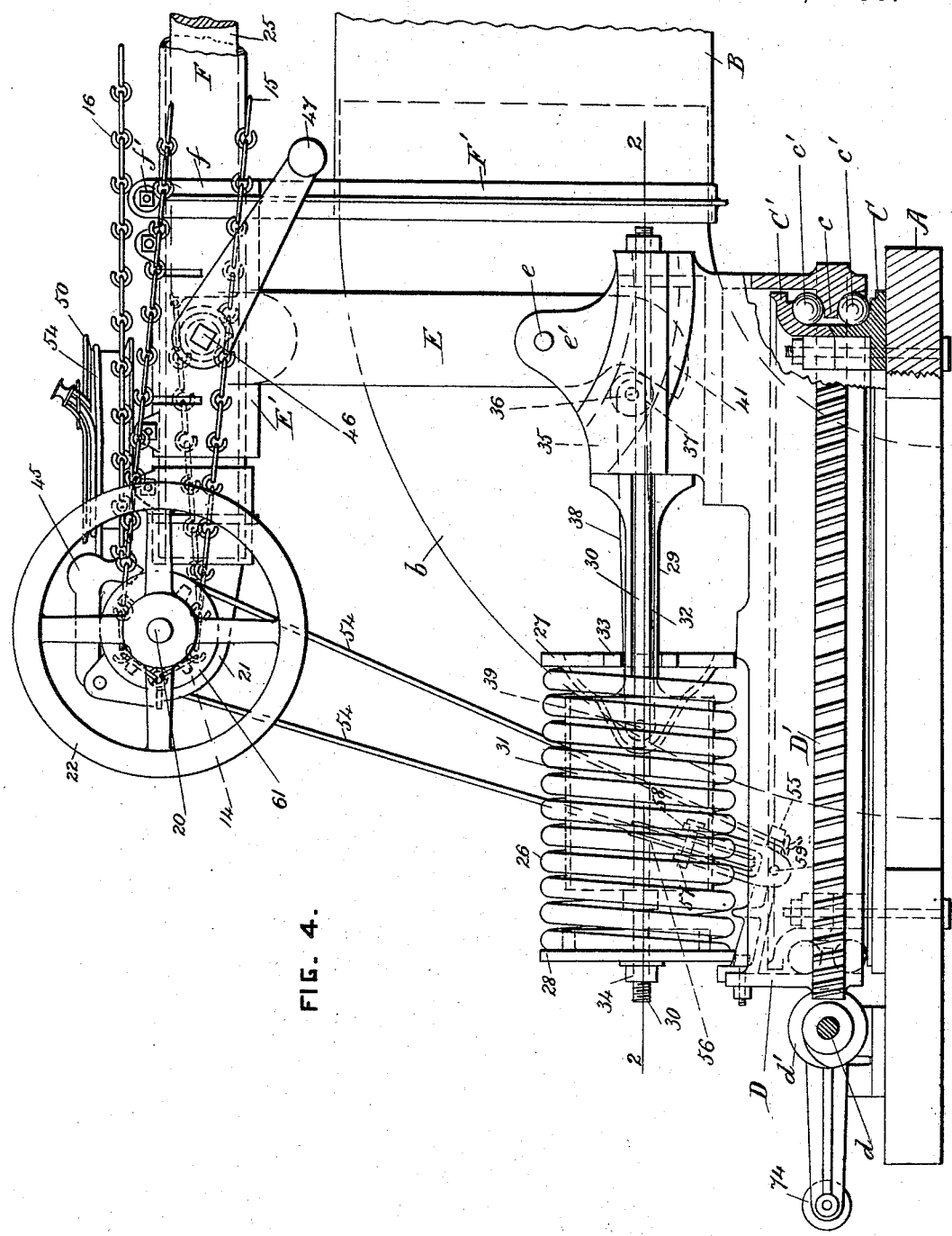

G. A. ANDERSON.
PNEUMATIC STACKER.

No. 573,125. Patented Dec. 15, 1896.

FIG. 5.

Witnesses

Inventor
Gustaf A. Anderson.
By Attorney (No Model.) 8 Sheets—Sheet 4.
G. A. ANDERSON.
PNEUMATIC STACKER.
No. 573,125. Patented Dec. 15, 1896.
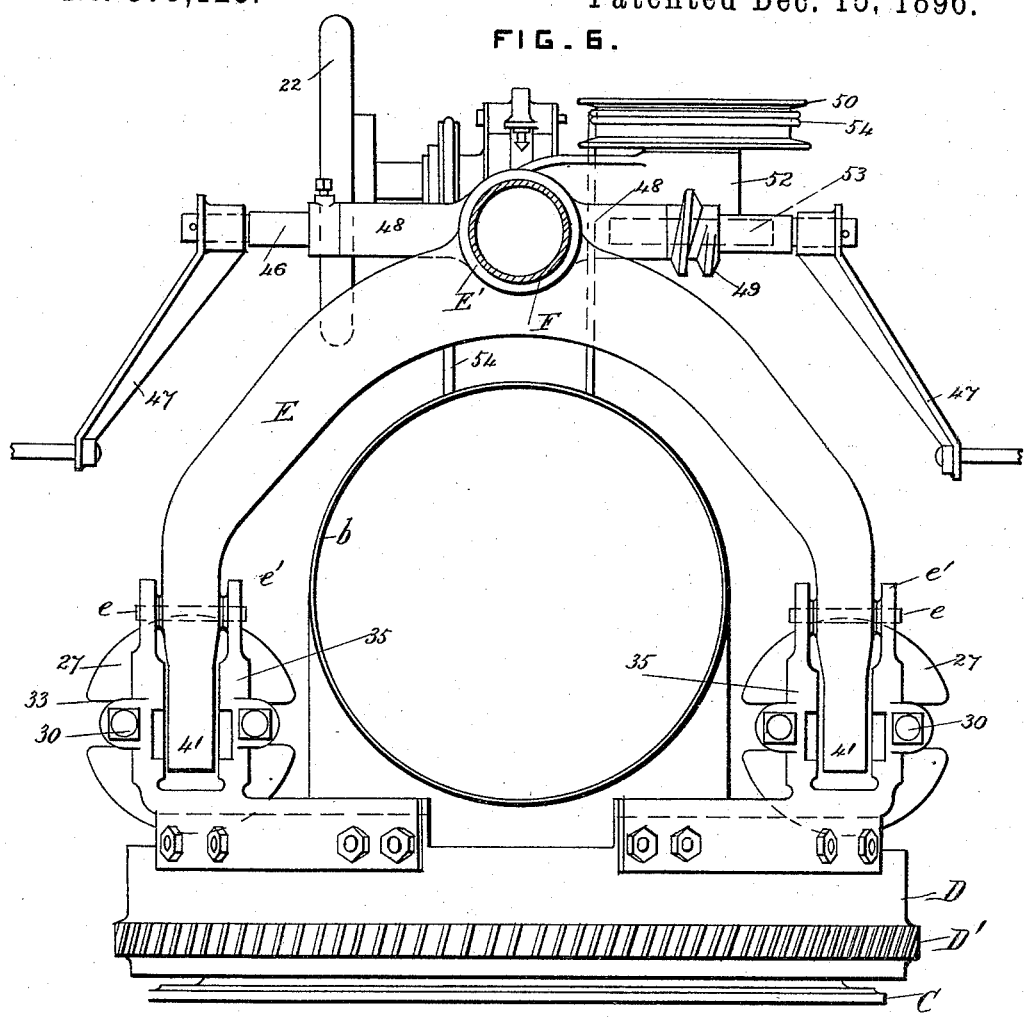
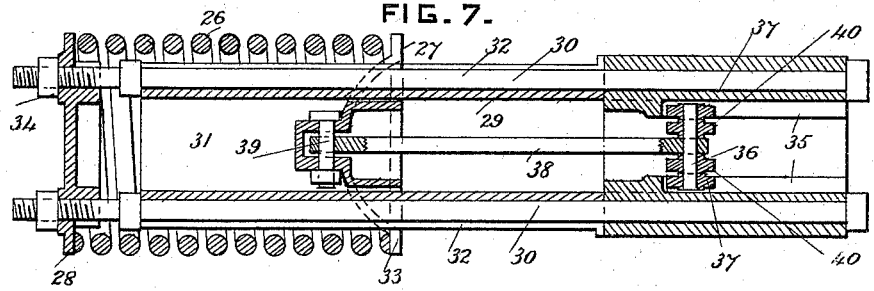
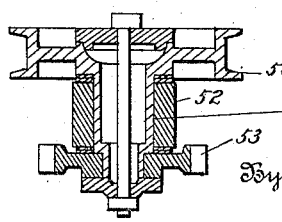
Witnesses
Inventor
Gustaf A. Anderson.
By Attorney Herbert W. T. Jenner.

(No Model.)
8 Sheets—Sheet 5.
G. A. ANDERSON.
PNEUMATIC STACKER.
No. 573,125.
Patented Dec. 15, 1896.
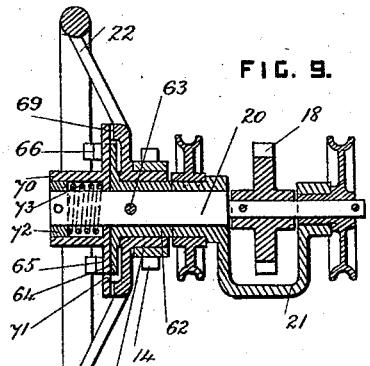
FIG. 9.
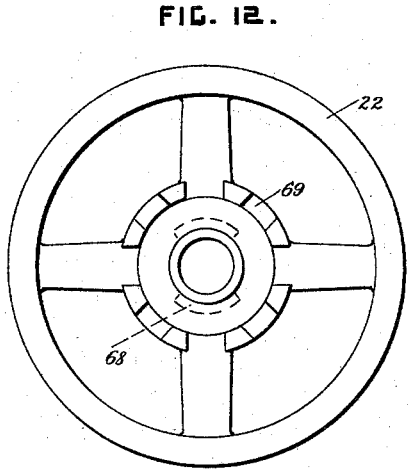
FIG. 12.
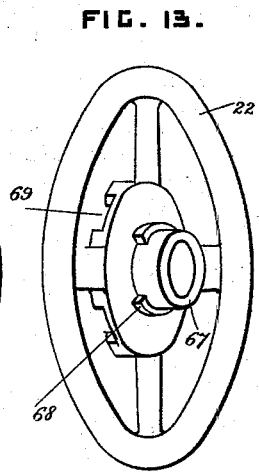
FIG. 13.
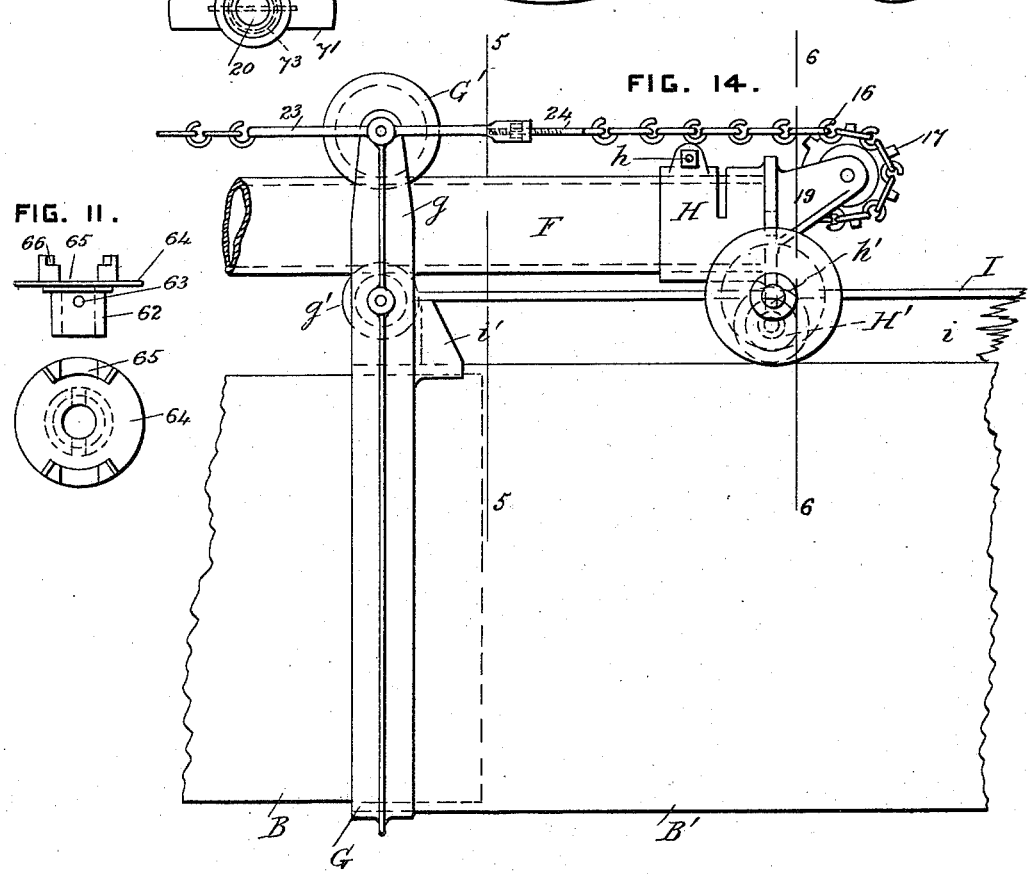
Witnesses
Inventor
Gustaf A. Anderson.
By Attorney (No Model.) 8 Sheets—Sheet 6.
G. A. ANDERSON.
PNEUMATIC STACKER.
No. 573,125. Patented Dec. 15, 1896.
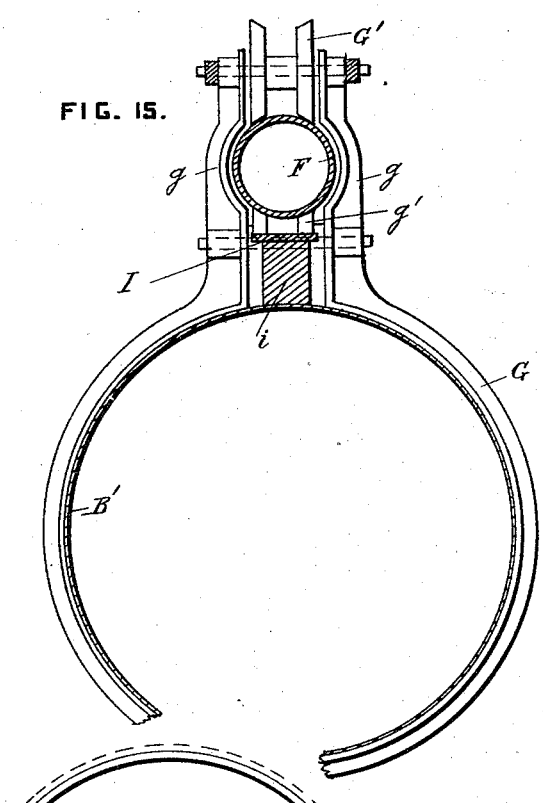
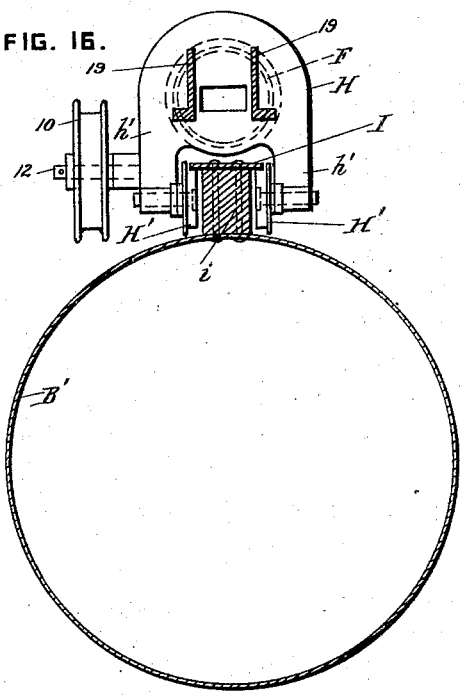
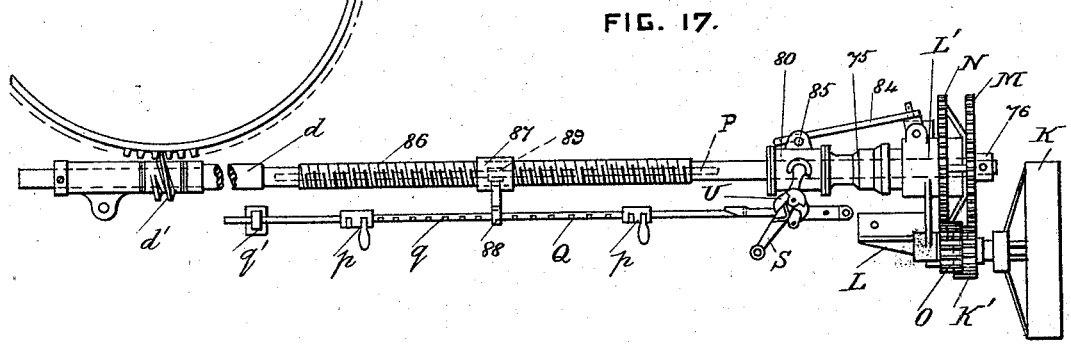
Witnesses
Inventor
Gustaf A. Anderson.
By Attorney Herbert W. T. Jenner.

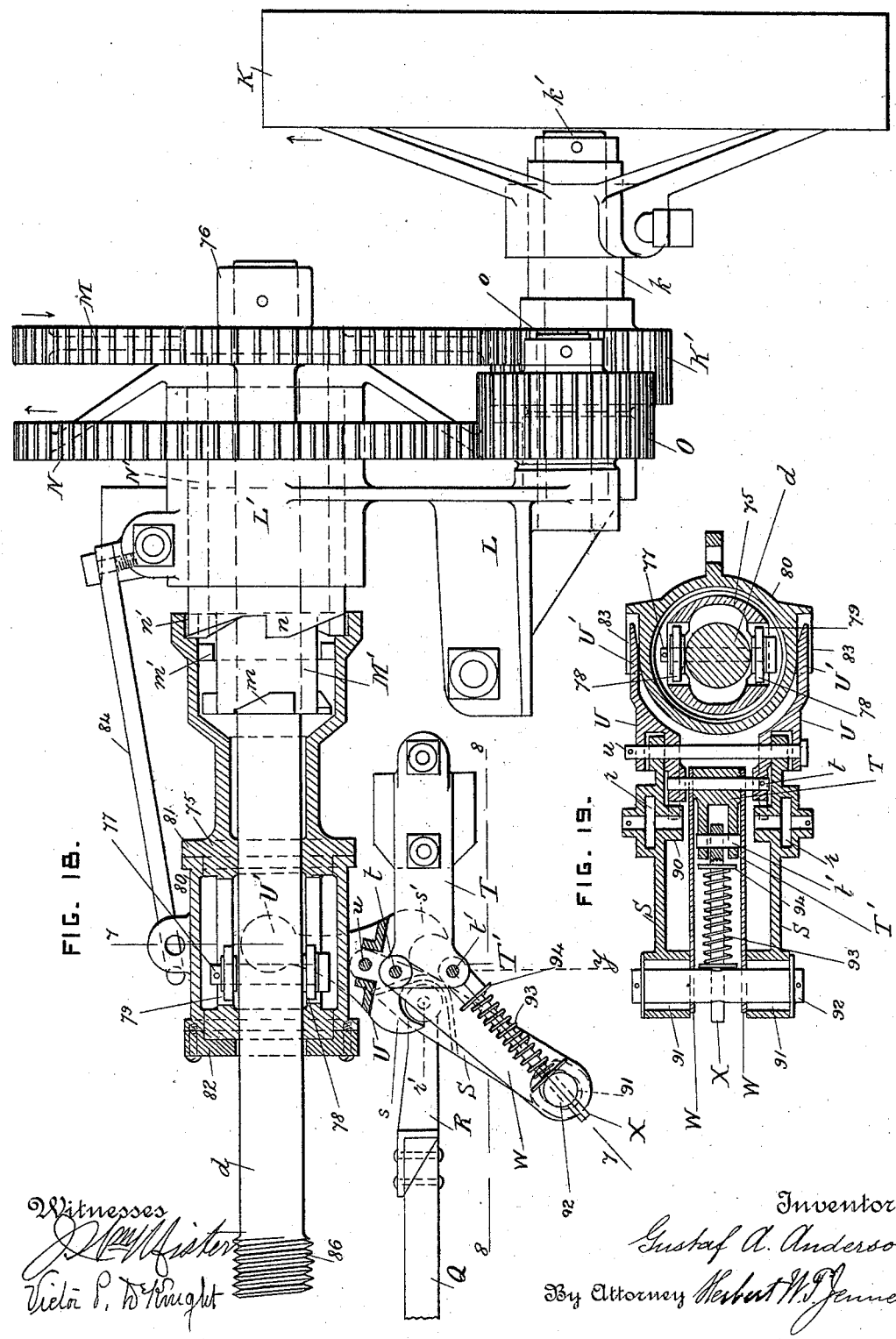

(No Model.)   8 Sheets—Sheet 8.

G. A. ANDERSON.
PNEUMATIC STACKER.

No. 573,125. Patented Dec. 15, 1896.

Witnesses

Inventor
Gustaf A. Anderson.
By Attorney Herbert W. T. Jenner.

UNITED STATES PATENT OFFICE.

GUSTAF ARVID ANDERSON, OF WAYNESBOROUGH, PENNSYLVANIA, ASSIGNOR TO THE GEISER MANUFACTURING COMPANY, OF SAME PLACE.

PNEUMATIC STACKER.

SPECIFICATION forming part of Letters Patent No. 573,125, dated December 15, 1896.

Application filed April 20, 1895. Serial No. 546,526. (No model.)

*To all whom it may concern:*

Be it known that I, GUSTAF ARVID ANDERSON, a subject of the King of Sweden and Norway, residing at Waynesborough, in the county of Franklin and State of Pennsylvania, have invented certain new and useful Improvements in Pneumatic Straw-Stackers; and I do hereby declare the following to be a full, clear, and exact description of the invention, such as will enable others skilled in the art to which it appertains to make and use the same.

This invention relates to pneumatic straw-stackers; and it consists in the novel construction and combination of the parts hereinafter fully described and claimed.

Figure 20:
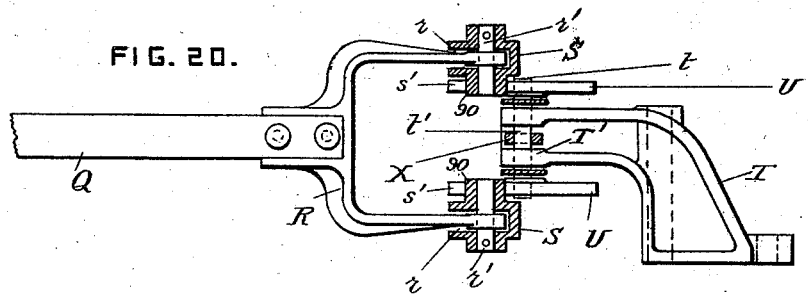
Figure 21:
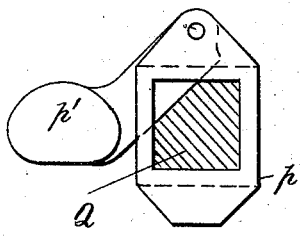
Figure 22:
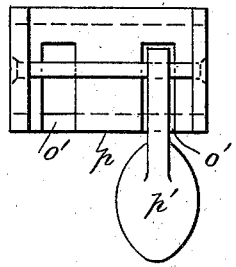
Figure 23:
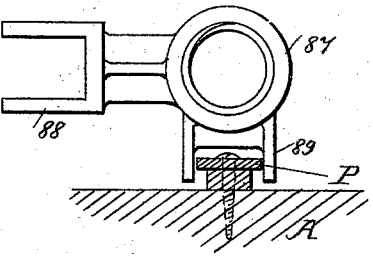
Figure 24:
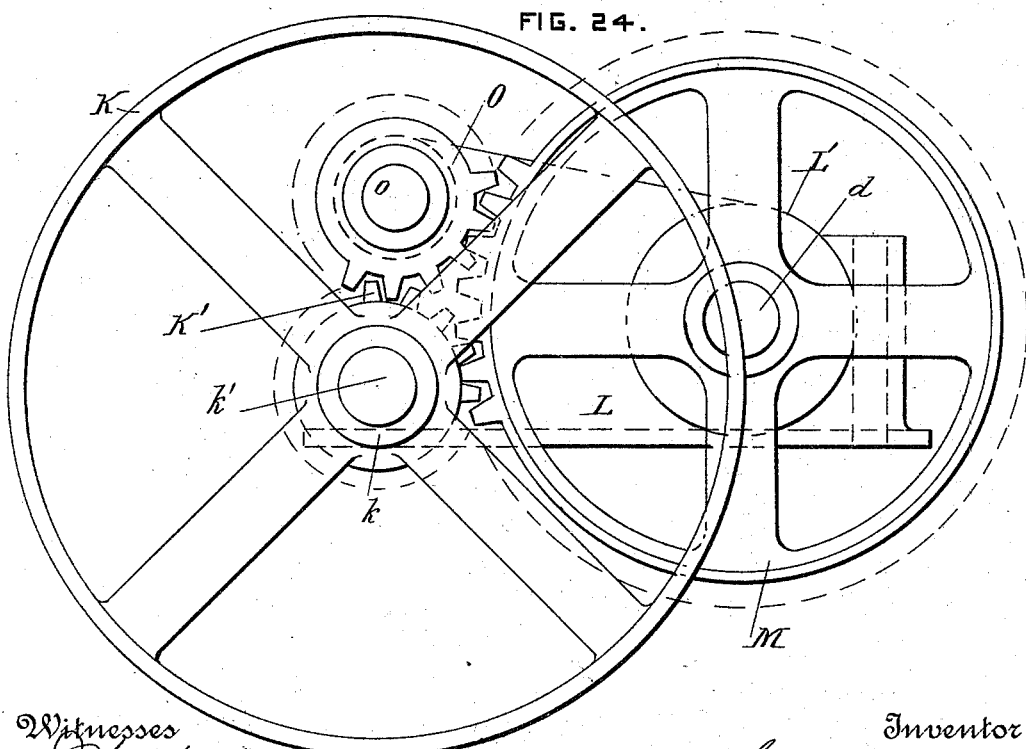

In the drawings, Figure 1 is a side view of the discharge-pipe and its connections. Fig. 2 is a plan view of the same. Fig. 3 is a side view of the discharge-pipe and its connections, showing a modification of the devices for changing its angle. Figs. 4, 5, and 6 are respectively a side view, a plan, and an end view of the lower part of the discharge-pipe and its connections, drawn to a larger scale. Fig. 7 is a sectional plan view taken on the line 2 2 in Fig. 4. Fig. 8 is a vertical section taken on the line 3 3 in Fig. 5. Fig. 9 is a vertical section taken on the line 4 4 in Fig. 5. Fig. 10 is an end view of the sleeve 70. Fig. 11 is a detail side and end view of the sleeve 62. Fig. 12 is a detail front view of the hand-wheel 22. Fig. 13 is a perspective rear view of the hand-wheel. Fig. 14 is a side view of the middle portion of the discharge-pipe, drawn to a larger scale. Figs. 15 and 16 are respectively cross-sections through the discharge-pipe, taken on the lines 5 5 and 6 6 in Fig. 14. Fig. 17 is a plan view of the devices for oscillating the discharge-pipe automatically. Fig. 18 is a plan view of a portion of the said devices shown in Fig. 17, but drawn to a larger scale and partly in section. Fig. 19 is a section taken on line 7 7 in Fig. 18. Fig. 20 is a section taken on line 8 8 in Fig. 18. Fig. 21 is a detail end view of one of the adjustable stops, and Fig. 22 is a plan view of the same. Fig. 23 is a detail end view of the reversing-tappet. Fig. 24 is an end view of the driving-wheels shown in Fig. 18.

A is a portion of the casing of a threshing-machine or separator, and $a'$ is the delivery-pipe, extending upward from the straw-discharger, which drives the straw, together with a blast of air, through the pipe $a'$, and is of any approved construction. The delivery-pipe $a'$ has a flexible junction-pipe $b$ on its upper end. This pipe $b$ is of any approved construction which will couple the pipe $a'$ with the discharge-pipe B and permit the pipe B to move freely in a vertical direction.

In carrying out the present invention the discharge-pipe is not necessarily extensible, but when required to be extensible it is preferably formed of two sections, of which the outer section B' slides telescopically over the inner section B.

C is a circular bracket secured to the top of the casing A concentric with the delivery-pipe, and C' is a removable ring secured to the top of the said bracket.

D is a cylindrical base for supporting the discharge-pipe. This base is provided with a flange $c$, and two series of balls $c'$ are provided and arranged between the said flange and the bracket C and ring C'. The flange comes between the two series of balls.

I do not claim the means for supporting the base C hereinbefore described, and I may use any other approved means for supporting the base so as to permit it to turn freely.

The base D is provided with means for revolving it, preferably consisting of a worm-wheel D', secured to or formed on its periphery, and a worm $d'$, secured on the shaft $d$. The shaft $d$ is journaled in suitable bearings secured to the top of the casing A, and the worm gears into the worm-wheel. The shaft $d$ may be revolved by any approved means, such as a handle 74 or power driving mechanism, as hereinafter more fully described.

E is a forked bracket the lower parts of which are pivoted to the lugs $e'$ on the base D by the pins $e$.

E' is a socket at the upper part of the bracket E.

F is a support, preferably tubular, which is secured in the socket E' by suitable clamping-bolts and which extends parallel with the inner pipe-section to a point a little beyond its end.

F' is a ring secured to the lower end portion of the pipe-section B and provided with a socket $f$, which is clamped to the support F by the bolt $f'$, close in front of the socket E'.

G is a ring secured to the lower end portion of the outer pipe-section B' and provided with arms $g$, which extend upwardly around and above the support F.

G' is a roller journaled between the arms $g$ above the support F, and $g'$ is a roller journaled between the said arms under the support F.

H is a cap clamped to the upper end of the support F by the bolt $h$ and provided with downwardly-projecting arms $h'$.

H' are rollers journaled on pins projecting laterally from the arms $h'$, the rollers being arranged between the said arms.

I is a plate secured parallel with the outer pipe-section B' by means of the distance-piece $i$ and suitable rivets or bolts. The distance-piece $i$ is preferably of wood, and the edges of the plate I project over it on each side and engage with the rollers H'.

The plate I and distance-piece $i$ constitute one form of longitudinal supporting device secured to the pipe-section B'. This supporting device is operatively connected with the projecting upper end of the support F in any approved manner, as, for instance, by the antifriction-rollers H'. Other approved means for supporting the pipe-section B' from the support F may, however, be used, and the pipe-section B' may be otherwise supported than by the support F, as, for instance, by permitting it to be supported by the lower pipe-section B, upon which it slides.

The lower end of the pipe-section B' is provided with any approved form of guide slidable on the support F, as, for instance, the arms $g$ and antifriction-rollers carried by them, but the guide may be dispensed with altogether, if desired.

I' is a strengthening-ring secured to the upper end portion of the pipe-section B'. The rings I' and G both have pockets $i'$ for receiving the ends of the distance-piece $i$ and helping to secure it in position.

J is the deflector-pipe, secured to the upper end portion of the pipe-section B'. This deflector-pipe is preferably formed of articulated segments pivotally connected to each other at their sides by the pins $j$. The segments are provided with eyes $j'$ on their upper sides, and the deflector-pipe is normally held in its bent position by gravity.

J' is a cord or its equivalent, such as a wire rope or chain, for operating the deflector-pipe. This cord passes through the eyes and is secured to the eye on the outer segment.

A guide-sheave 10 is journaled on a pin 12, projecting laterally from one side of the cap H. A sheave 14 is supported at the lower end of the discharge-pipe and is preferably a chain-sheave. An endless drive-chain 15 engages with the sheaves 10 and 14, and the means for operating the said sheave 14 and the drive-chain will be more fully described hereinafter. The cord J' is fastened to the upper part of the chain 15.

The pipe-section B' may be pushed in or out by hand by taking hold of the ring G or any other part of the pipe and using sufficient force to move it in the required direction, but some mechanism is desirable to enable the pipe-section B' to be operated beyond the reach of the operator standing on the top of the threshing-machine.

For the purpose of telescoping the outer pipe-section B' to its full extent an endless flexible connection, such as the drive-chain 16, is provided. The lower part of the chain 16 is passed through the tubular support F, and its ends are carried by the sheaves 17 and 18. The sheave 17 is journaled between the arms 19, projecting from the cap H, and the sheave 18 is secured on the shaft 20, which is journaled in the bracket 21, secured to the lower end of the support F. A hand-wheel 22 is connected to the shaft 20 for operating the drive-chain. The upper part of the chain 16 is securely connected with the pipe-section B' by means of the yoke 23, which is coupled to the arms $g$ of the ring G, and the screw-threaded bolt 24, which serves to take up the slack of the chain as it becomes worn and stretched.

A counterweight 25 is secured to the chain 16 inside the tubular support F, which guides and supports it. This counterweight may be dispensed with, if desired. Its use is to give the discharge-pipe a uniform resistance to being lifted irrespective of the position of the pipe-section B'. When the pipe-section B' is slid out, the counterweight is at the lower end of the tubular support and adds but little to the resistance of the tube to being lifted, but when the pipe-section B' is slid in, and the center of gravity of the discharge-pipe is therefore nearer the fulcrum-pins $e$, the counterweight 25 is slid out, so as to make the resistance substantially equal to that of the extended discharge-pipe.

The discharge-pipe and the parts attached to it are substantially balanced, so that very little force is required to change the angle of the discharge-pipe. This is accomplished by means of springs 26, two similar springs and sets of connections being preferably used and arranged one on each side of the discharge-pipe. It is obvious, however, that the discharger can be balanced by means of a single large spring and one set of connections upon one side of the discharge-pipe.

Each spring 26 is arranged between a front plate 27 and a rear plate 28. A horizontal guide 29 is secured to the base D by bolts 30. This guide has a cylindrical portion 31 inside the spring, and the bolts 30 lie in pockets 32 in its sides and clamp the guide to the base. The front plate 27 is slidable in the guide 29 and is provided with forked side portions 33 for engaging with it. The rear plate 28 is secured on the projecting screw-threaded ends of the bolts 30, and 34 are nuts for changing the position of the plate 28 and adjusting the tension of the spring.

Curved guides 35 are formed in the base D below the fulcrum-pin e, and 36 is a pin provided with rollers 37 on its ends, which roll freely in the said guides. A connecting-rod 38 engages with the middle portion of the pin 36, and has its other end pivoted to the front plate 27 by the pin 39. Rollers 40 are journaled on the pin 39 between the connecting-rod and the rollers 37. Each arm of the forked bracket E has an end 41 projecting below the fulcrum-pin, (there being two similar ends, one on each side of the discharge-pipe,) and this end bears against the two rollers 40. The curvature of the guides 35 is so arranged as to cause the weight of the discharge-pipe and its connections to be substantially balanced by the spring or springs 26 in all its positions.

When the discharge-pipe is down, as shown in Fig. 1, and the springs 26 are compressed to their full extent, the rollers 40 are near the fulcrum-pins e and the discharge-pipe and the springs are substantially in equilibrium. When the discharge-pipe is raised, its resistance decreases as its angle with the vertical becomes less, and the resistance of the springs 26 also decreases, but in a different proportion. As the connecting-rods move forward the rollers 40 are slid down the ends 41, by the rollers 37 and the guides 35, farther from the fulcrum-pins, so as to compensate for the difference in the change of the two resistances and maintain the discharge-pipe and springs substantially in equilibrium.

The discharge-pipe may be raised and lowered by hand, and for this purpose, in the modification shown in Fig. 3, a handle 42 is provided. This handle projects from the bracket 21, and in order to prevent the discharge-pipe from being moved out of place accidentally, as, for instance, by the wind, when working in the open air, a sustaining device is provided. In the modification shown in Fig. 3 this sustaining device consists of a bar 43, pivoted to the base, and a catch 44, of approved construction, carried by the said handle and operatively engaging with the said bar.

A hooked catch 45 is pivoted to the bracket 21 and is dropped into engagement with the drive-chain 16, after the discharge-pipe has been telescoped to the required extent, to prevent the pipe-section B' from slipping.

When the counterweight 25 is not used, or when it is made small and does not fully compensate for the change in the resistance of the pipe B' to being lifted, it is desirable to use a lifting-tackle for changing the angle of the discharge-pipe. A shaft 46 is provided with crank-handles 47 and is journaled in bearings 48 in the bracket E. A worm 49 is secured on the shaft 46. A winding-drum 50 is secured on a vertical shaft 51, which is journaled in the lug 52, projecting from the bracket E. A worm-wheel 53 (see Fig. 8) is secured on the lower end of the shaft 51 and gears into the said worm. A lifting-cord 54 is secured at one end to the winding-drum, and at the other end to the lug 55 on the base D. A sheave 56 is journaled on a pin 57, passing through the double eye 58, and the lower end of the double eye is pivoted to the base by the pin 59. Two sheaves 60 and 61 are carried by the shaft 20, one on each side of the bracket 21. The lifting-cord passes from the drum 50, over the sheave 60, around the sheave 56, over the sheave 61, and downward to the lug 55. The discharge-pipe is raised and lowered by turning the handles 47 and thereby revolving the winding-drum.

When the two chain-sheaves 14 and 18 are carried by the same shaft 20, as shown in the drawings, they are preferably made of the same diameter, and the means for connecting them with the hand-wheel 22 are shown in Figs. 9 to 12. The shaft 20, which is supported by the bracket 21, has a sleeve 62 secured to it by the pin 63. The sleeve 62 has a flange 64 at one end, and 65 are clutch-jaws projecting from the flange 64. Stops 66 project from the tops of the jaws 65 and have wider spaces between them than the clutch-jaws. The hand-wheel 22 is journaled on the sleeve 62, and the chain-sheave 14 for operating the deflector-pipe is rigidly secured to the hub 67 of the hand-wheel by means of the projections 68 on the hand-wheel, which fit into corresponding recesses in the chain-wheel. The hand-wheel 22 is provided with projecting clutch-jaws 69, arranged in the same plane with the clutch-jaws 65.

The chain-sheave 18 for operating the telescopic pipe-section B' is secured on the shaft 20. A slidable sleeve 70 is mounted on the end of the shaft 20 and is provided with laterally-projecting arms 71, which engage with both the clutch-jaws 65 and 69. A collar 72 is secured on the end of the shaft 20, in a recess in the sleeve 70, and 73 is a spring arranged in the said recess and bearing against the said collar. This spring holds the arms 71 in engagement with the clutch-jaws. When thus connected and the hand-wheel is revolved, both chain-sheaves are revolved synchronously and the discharge-pipe is telescoped without changing the position of the deflector-pipe.

When the position of the deflector-pipe requires to be changed, the sleeve 70 is pulled forward until the arms 71 are out of engagement with the clutch-jaws, and the sleeve is then turned around until the arms come against the stops 66 and rest upon the tops of the clutch-jaws 65. The hand-wheel can now be used to revolve the chain-sheave 14 and adjust the position of the deflector-pipe without turning the shaft 20 and the chain-sheave 18. The hooked catch 45 locks both drive-chains when the hand-wheel is clutched to the shaft 20.

When the discharge-pipe is to be oscillated by power, the handle 74 is preferably removed from the shaft d.

K is a belt-pulley driven from any convenient shaft of the threshing-machine. This pulley K is secured to the hub $k$ of the pinion K', which is journaled on the pin $k'$, projecting from the bracket L. The bracket L is secured to the casing A and is provided with a large bearing L'.

N is a toothed wheel provided with a hub N', which is journaled in the bearing L' and is provided with a clutch-jaw $n$ on its end.

M is a toothed wheel provided with a hub M', which is journaled in the hub N' and is provided with a clutch-jaw $m$ on its end. The two wheels M and N are narrow and of the same diameter, and the pinion K' gears into the wheel M.

O is a toothed pinion journaled on the pin $o$, projecting from the bracket L, and gearing into the wheel N. The two pinions K' and O are wide and gear into each other. When the pulley K is driven in the direction of the arrow, the two wheels M and N and their clutch-jaws are driven in opposite directions, as indicated by the arrows, and at the same speed.

A sleeve 75 is splined to the shaft $d$, and the said shaft is journaled in the hub M' and is provided with a collar 76 to prevent the wheel M from slipping off it. The sleeve 75 is provided with clutch-jaws $m'$ and $n'$, which engage with the clutch-jaws $m$ and $n$, respectively.

In order that the sleeve 75 may slide upon the shaft $d$ with the least possible friction, a pin 77 is passed through a hole in the shaft and is provided with rollers 78 on its ends. These rollers run in the slots 79 of the sleeve and permit it to be slid back and forth with great facility.

A cylindrical ring 80 is journaled on the sleeve 75 and is retained in position endwise by the shoulder 81 and the cap 82. Pockets 83 are formed on the upper and lower side of the ring 80, and 84 is a hook pivoted to the bracket L and adapted to be dropped into a hole 85 in a lug on the ring 80, so as to hold the clutch-jaws $m'n'$ in a middle position between the clutch-jaws $m$ $n$ when the device for driving by power is not required in operation.

A screw-threaded portion 86 is provided on the shaft $d$, and 87 is a tappet engaging with the said screw-threaded portion and having a forked jaw 88 on its front side and a forked jaw 89 under it.

P is a longitudinal guide secured to the casing A under the shaft $d$ for the jaw 89 to engage with, so that the tappet cannot revolve with the shaft.

Q is a tappet-rod arranged in front of the shaft $d$ and passing through the forked jaw 88 of the tappet. One end of the tappet-rod is supported by the bracket $q'$, and $q$ are notches cut in the front upper edge of the rod. The tappet-rod is provided with two similar stops $p$. These stops are slipped over the rod and are each provided with a pivoted latch $p'$ and two slots $o'$. The slots $o'$ are arranged at such a distance apart that when one slot is over a notch in the tappet-rod the other is between two notches, thus enabling a finer longitudinal adjustment of the stop to be made with a given number of notches in the tappet-rod. The latch $p'$ drops through the slot $o'$ and engages with the notch in the tappet-rod and thereby secures the stop in position. When the stop is to be adjusted for less than the distance between any two notches, the latch $p'$ is raised out of one slot $o'$, slid along its pivot-pin, and dropped into the other slot. The other end of the tappet-rod from the bracket $q'$ is provided with a forked bracket R, the ends of which are arranged in the pockets $r$ of the levers S and are pivoted to the said levers by the pins $r'$.

T is a bracket secured to the top of the casing A and provided with a forked front portion T' and two vertical pivot-pins $t$ and $t'$.

U are two levers secured on the ends of the pin $t$, which is nearer the shaft $d$ than the pin $t'$, above and below the part of the bracket in which the said pin is journaled. The rear parts U' of the levers U engage with the pockets 83 on the ring 80. The front parts of the levers U are each provided with two projections $s$ and $s'$, separated by a wide space having a curved bottom.

The levers S are pivoted to the levers U by the pin $u$, which passes through them between the pin $t$ and the shaft $d$. The levers S are provided with projecting bosses 90, concentric with the pins $r'$, and the said bosses work in the spaces between the projections $s$ and $s'$ of the levers S. The free ends of the levers S are provided with longitudinal slots 91.

W are two radius-links pivoted at one end on the pin $t$ between the bracket and the levers U. The other ends of the radius-links carry a vertical pin 92, the ends of which are free to slide in the slots 91.

X is a rod pivoted on the pin $t'$ in the forked portion T' of the bracket T. The free end of the rod X slides in a hole in the pin 92, and 93 is a spiral spring encircling the rod X and interposed between the pin 92 and a collar 94 on the said rod. This spring operates to reverse the clutch mechanism suddenly.

When the parts are in the positions shown in Fig. 18 and the tappet strikes the right-hand stop, it moves the stop and the tappet-rod to the right. The forked bracket R presses the levers S to the right, the resistance being on the two pins 92 and $u$. The clutch-jaw $n'$ is pressed more firmly into the clutch-jaw $n$, and is prevented from leaving it because the pin $u$ is between the pivot-pin $t$ of the levers U and their rear ends U', which operate the clutch-jaw $n'$. The levers S move to the right as the tappet actuates the stop until the center of the pin 92 passes the line $y$ drawn through the centers of the pins $t$ and $t'$. The spring 93, which has been compressed in moving from the left to the line $y$, now causes the levers S to move suddenly to the right, carrying with them the radius-links W and the tappet-rod Q. The bosses 90 of the levers S strike the right-hand projections s' of the levers U and turn the said levers on their pivot-pin, moving the ends U' of said levers to the left. This movement of the levers U disengages the clutch-jaws n' n and slides the clutch-jaw m' into engagement with the clutch-jaw m. This action reverses the direction of the movement of the stacker discharge-pipe. The said pipe oscillates back and forth continuously, the amplitude of the oscillations of the pipe being regulated by the distance between the adjustable stops on the tappet-rod.

The motion of the stacker-pipe can be stopped or reversed instantaneously by hand by taking hold of the sleeve 75 or the ring 80 or any other slidable part attached to the said sleeve and pushing the sleeve in the direction necessary to effect the desired change.

Various approved devices for reversing the direction of motion may be used in carrying out this invention, but the hereinbefore-described devices are preferred because they press the clutch-jaws more firmly into engagement with each other just before releasing them, hold them firmly pressed together until the moment they should be released, and then release them very suddenly.

If the bosses 90 of the levers S fail to disengage the clutch-jaws when they strike the projections on the levers U, they remain resting against the said projections until the continued revolution of the shaft d causes the tappet 87 to overtake the stop on the tappet-rod and push the said tappet-rod farther in the same direction, thereby pressing the bosses 90 hard against the said projections, forcibly turning the levers U on their pivot-pin, and thus releasing the clutch-jaws.

I am aware of the invention of Abraham E. Price in pneumatic straw-stackers, for which an application for Letters Patent is filed, bearing the same date as this application, and I do not claim anything claimed therein by him.

I do not in this application claim "the combination, with a telescopic discharge-pipe and a deflector at its outer end, of two slidable conections, one connected to the slidable pipe-section and the other to the deflector, two driving devices for operating the said connections respectively, and clutch mechanism connecting the said driving devices, whereby they may be coupled together or uncoupled," as I claim this subject-matter in a separate application filed October 30, 1896, Serial No. 610,564, as a division of this application.

What I claim is—

1. In a straw-stacker, the combination, with the inner section of a discharge-pipe, and a support secured parallel with the said pipe-section and projecting beyond its upper end; of an outer slidable pipe-section provided with a longitudinal supporting device operatively connected with the projecting end of the said support, and a guide secured to the lower part of the said slidable pipe-section and engaging with the main portion of the said support, substantially as set forth.

2. In a straw-stacker, the combination, with the inner section of a discharge-pipe, and a support secured parallel with the said pipe-section and projecting beyond its upper end; of an outer slidable pipe-section having a longitudinal supporting-plate secured to it; rollers carried by the projecting end of the said support and arranged under the said plate; and a guide secured to the lower part of the said pipe-section and engaging with the main portion of the said support, substantially as set forth.

3. In a straw-stacker, the combination, with the inner section of a discharge-pipe, and a support secured parallel with the said pipe-section and projecting beyond its upper end; of an outer slidable pipe-section provided with a longitudinal supporting device operatively connected with the projecting end of the said support; arms secured to the lower part of the said slidable pipe-section, and guide-rollers carried by the said arms and arranged above and below the said support, substantially as set forth.

4. In a straw-stacker, the combination, with a telescopic discharge-pipe, of a stationary support secured to the lower pipe-section and projecting beyond its upper end, a slidable longitudinal supporting-bar secured to the upper and slidable pipe-section under the said stationary support, and means for supporting the said bar from the projecting end portion of the stationary support, substantially as set forth.

5. In a straw-stacker, the combination, with the inner section of a discharge-pipe, and a tubular support secured parallel thereto and provided with sheaves at its ends; of an outer slidable pipe-section, and a flexible connection attached to the said slidable pipe-section, passing over the said sheaves, through the said support, and affording a means for operating the slidable pipe-section, substantially as set forth.

6. In a straw-stacker, the combination, with the inner section of a discharge-pipe, and a tubular support secured parallel thereto and provided with chain-sheaves at its ends; of an outer slidable pipe-section; a chain connected to the said slidable pipe-section, passing over the said sheaves and through the said support; and a catch for engaging with the said chain and preventing the outer pipe-section from sliding, substantially as set forth.

7. In a straw-stacker, the combination, with a base, a forked bracket pivoted to the base, a discharge-pipe, and a single support arranged centrally over the top of the discharge-pipe, said support being secured to the said bracket and having an end portion projecting rearwardly behind its fulcrum; of a lifting and sustaining device arranged between the said projecting end of the support behind the bracket and the rear portion of the said base, substantially as set forth.

8. In a straw-stacker, the combination, with a base, a discharge-pipe, and a support for the discharge-pipe arranged parallel therewith and pivotally supported from the said base and having an end portion projecting rearwardly behind its fulcrum; said end portion being a prolongation of the main portion of the said support, of a sustaining device arranged between the said rearwardly-projecting end and the base, substantially as set forth.

9. The combination, with the base, and the forked bracket pivoted thereto; of the handle-shaft provided with a worm and journaled transversely in the upper part of the said bracket, a horizontally-arranged winding-drum and a worm-wheel connected together and driven by the said worm, a guide-sheave carried by the said base, guide-sheaves supported by the said bracket, and a lifting-cord secured to the said drum at one end, passing over and around the said guide-sheaves, and having its other end secured to the said base, substantially as set forth.

10. The combination, with the outer slidable section of a discharge-pipe, two strengthening-rings secured one at each end of the said pipe-section and provided with pockets, a distance-piece extending longitudinally of the said pipe-section and having its ends secured in the said pockets, and a supporting-plate overlapping the said distance-piece and secured to it and to the said pipe-section; of a support secured parallel with the pipe-section and provided with antifriction devices engaging with the overlapping edges of the said plate, substantially as set forth.

11. In a straw-stacker, the combination, with a pivoted telescopic discharge-pipe, of a slidable weight operatively connected with the slidable section of the said pipe, the said weight and slidable pipe-section being constrained to move in opposite directions, whereby the resistance of the pipe to being raised is rendered more uniform, substantially as set forth.

12. In a straw-stacker, the combination, with the inner section of a discharge-pipe, and a tubular support secured parallel thereto and provided with sheaves at its ends; of an outer slidable pipe-section, a flexible connection connected to the said slidable pipe-section, passing over the said sheaves and through the said support; and a weight secured to the said connection inside the said tubular support, substantially as set forth.

13. In a straw-stacker, the combination, with a telescopic discharge-pipe, and a deflector-pipe at its outer end; of a supporting-bracket, and a shaft journaled therein; two chain-sheaves carried by the said shaft and formed of equal diameter; driving mechanism and disengaging devices permitting the said sheaves to be revolved singly or simultaneously; and two chains passing around the said sheaves and operatively connected with the sliding pipe-section and with the deflector-pipe, respectively, substantially as set forth.

14. In a straw-stacker, the combination, with a telescopic discharge-pipe, and a deflector-pipe at its outer end; of a supporting-bracket, and a shaft journaled therein; a chain-wheel secured on the said shaft, a chain engaging with the said wheel and operatively connected with the slidable pipe-section; a hand-wheel mounted concentric with the said shaft; clutch mechanism for connecting the hand-wheel to the said shaft; a chain-wheel secured to the said hand-wheel; and a chain engaging with the last-said chain-wheel and operatively connected with the deflector-pipe, substantially as set forth.

15. In a straw-stacker, the combination, with a discharge-pipe, and a spring for counterbalancing the weight of the said pipe; of a compensating device interposed between the said spring and the pipe and operating to maintain the pressure of the spring substantially in equilibrium with the resistance of the said pipe when being raised or lowered to different angles, substantially as set forth.

16. In a straw-stacker, the combination, with a discharge-pipe, and a pivoted arm connected with the said pipe; of a spring for counterbalancing the weight of the said pipe, and guides operating to automatically vary the distance between the pivot of the said arm and the point at which the pressure of the said spring is applied to it, whereby the pressure of the said spring is compensated and maintained substantially in equilibrium with the resistance of the pipe when being raised or lowered to different angles, substantially as set forth.

17. In a straw-stacker, the combination, with a telescopic discharge-pipe, and a slidable weight operating to cause the said pipe, when placed at any one angle, to oppose a substantially uniform resistance to being raised irrespective of the position of its slidable pipe-section; of a spring for counterbalancing the said resistance of the pipe; and a compensating device operating to maintain the pressure of the spring substantially in equilibrium with the said resistance when the said pipe is raised or lowered to different angles, substantially as set forth.

18. In a straw-stacker, the combination, with a base; and a discharge-pipe and a forked bracket connected together and pivoted to the said base; of springs carried by the said base one on each side of the discharge-pipe and pressing against the lower projecting ends of the said bracket, and guides on the said base operating to vary the distance between the pivots of the said arms and the points at which the pressure of the said springs is applied to them, substantially as set forth.

19. In a straw-stacker, the combination, with a base; and a discharge-pipe and a bracket connected together and pivoted to the said base; of a guide secured to the said base, a spring carried by the said guide, a slidable front plate bearing against the said spring, a connecting-rod pivoted to the said front plate and operatively connected with the projecting end of the said bracket, and curved guides on the said base operating to vary the distance between the pivot of the said bracket and the point of application of the pressure of the said spring, substantially as set forth.

20. In a straw-stacker, the combination, with a base; and a discharge-pipe and a bracket connected together and pivoted to the said base; of a spring supported by the said base, a slidable front plate bearing against the said spring, a connecting-rod pivoted to the said front plate at one end and provided with a pin and rollers at its other end, and guides on the said base engaging with the outer rollers and causing the inner rollers to roll upon the projecting end of the said bracket as the said pipe is raised or lowered, substantially as set forth.

21. In a straw-stacker, the combination, with a base; and a discharge-pipe and a bracket connected together and pivoted to the said base; of a horizontal guide having a cylindrical end portion and pockets in its sides; bolts arranged in the said pockets, clamping the said guide to the base, and provided with screw-threaded projecting ends; a spring carried by the said guide, a rear plate and nuts for adjusting the pressure of the said spring, and a front plate and intermediate connections interposed between the said spring and bracket, substantially as set forth.

22. In a straw-stacker, the combination, with a revoluble base for supporting the discharge-pipe, a driving-shaft, and intermediate driving mechanism operatively connecting the said shaft and base; of a toothed wheel M provided with a long hub and a clutch-jaw and journaled on the said shaft, a toothed wheel N provided with a clutch-jaw and journaled on the said hub between the wheel M and its clutch-jaw, a slidable sleeve splined to the said shaft and provided with clutch-jaws for engaging with the aforesaid clutch-jaws, two toothed pinions gearing into each other and respectively into the two said wheels, and means for revolving one of the said pinions, whereby the wheels M and N are revolved in opposite directions, substantially as set forth.

23. In a straw-stacker, the combination, with a revoluble base for supporting the discharge-pipe, a driving-shaft, intermediate driving mechanism operatively connecting the said shaft and base, two clutch-jaws journaled on the said shaft, and driving devices operating to revolve the clutch-jaws in opposite directions; of a pin passing through a hole in the said shaft and provided with rollers on its ends, and a slidable sleeve provided with slots engaging with the said rollers, and having clutch-jaws for engaging with the aforesaid clutch-jaws, substantially as set forth.

24. In a straw-stacker, the combination, with a revoluble base for supporting the discharge-pipe, a driving-shaft provided with a screw-threaded portion, intermediate driving mechanism operatively connecting the said shaft and base, and driving devices and clutch mechanism operating to revolve the said shaft in opposite directions; of a tappet engaging with the said screw-threaded portion, a guide preventing the said tappet from revolving, a tappet-rod operatively connected with the said clutch mechanism, and two adjustable stops secured to the said tappet-rod in the path of the said tappet, substantially as set forth.

25. The combination, with the driving-shaft $d$, the clutch-jaws $m$ and $n$ mounted concentric with the said shaft and revolving in opposite directions, and the slidable sleeve splined to the said shaft and provided with clutch-jaws $m'$ and $n'$ for engaging with the aforesaid clutch-jaws; of a tappet-rod; and intermediate pivoted lever mechanism provided with an operating-spring substantially as set forth and interposed between the said tappet-rod and sleeve, the said spring-operated lever mechanism operating to cause the intergearing clutch-jaws to be more firmly pressed together when the tappet-rod is moved to disengage the clutch-jaws and then to suddenly uncouple the said clutch-jaws, substantially as set forth.

26. The combination, with the driving-shaft $d$, the clutch-jaws mounted concentric with the said shaft and revolving in opposite directions, and the slidable sleeve splined to the said shaft and provided with clutch-jaws for engaging with the aforesaid clutch-jaws; of a stationary bracket having two pivot-pins $t$ and $t'$; the levers U secured on the ends of the pins $t$, operatively connected with the said slidable sleeve, and provided with the projections $s$ and $s'$; the levers S pivoted to the levers U and provided with slots 91, and bosses for engaging with the said projections; the radius-links pivoted to the pins $t$ and provided with a pin 92 slidable in the said slots 91; the rod pivoted on the pin $t'$, slidable in a hole in the pin 92, and provided with the operating-spring 93; and a tappet-rod pivotally connected to the said levers S and operating to effect the reversal of the direction of the revolution of the said driving-shaft when moved longitudinally, substantially as set forth.

In testimony whereof I affix my signature in presence of two witnesses.

GUSTAF ARVID ANDERSON.

Witnesses:
WM. G. EPPLEY,
DANIEL S. BEARD.